(12) United States Patent
Miyamoto et al.

(10) Patent No.: US 11,359,567 B2
(45) Date of Patent: Jun. 14, 2022

(54) CONTROL DEVICE FOR FUEL INJECTION DEVICE

(71) Applicant: Hitachi Astemo, Ltd., Hitachinaka (JP)

(72) Inventors: Akiyasu Miyamoto, Tokyo (JP); Takao Miyake, Hitachinaka (JP); Taisuke Sugii, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/422,007

(22) PCT Filed: Feb. 6, 2020

(86) PCT No.: PCT/JP2020/004480
§ 371 (c)(1),
(2) Date: Jul. 9, 2021

(87) PCT Pub. No.: WO2020/195206
PCT Pub. Date: Oct. 1, 2020

(65) Prior Publication Data
US 2022/0099040 A1    Mar. 31, 2022

(30) Foreign Application Priority Data

Mar. 25, 2019   (JP) ............................. JP2019-056046

(51) Int. Cl.
*F02D 41/20*     (2006.01)
*F02D 41/04*     (2006.01)
(Continued)

(52) U.S. Cl.
CPC .............. *F02D 41/04* (2013.01); *F02D 41/20* (2013.01); *F02D 41/34* (2013.01); *F02M 51/06* (2013.01);
(Continued)

(58) Field of Classification Search
CPC ..... F02D 2041/2027; F02D 2041/2051; F02D 2041/2055; F02D 2041/2058; F02D 2041/2062

See application file for complete search history.

(56) References Cited

U.S. PATENT DOCUMENTS

2014/0000564 A1* 1/2014 Shibata ................. F02D 41/401
123/472
2016/0177855 A1   6/2016 Kusakabe et al.
(Continued)

FOREIGN PATENT DOCUMENTS

JP    2014-234922 A    12/2014
JP    2015-169079 A     9/2015
(Continued)

OTHER PUBLICATIONS

International Search Report (PCT/ISA/210) issued in PCT Application No. PCT/JP2020/004480 dated May 19, 2020 with English translation (four (4) pages).
(Continued)

*Primary Examiner* — Erick R Solis
(74) *Attorney, Agent, or Firm* — Crowell & Moring LLP

(57) ABSTRACT

Provided is a control device for a fuel injection device capable of detecting a variation in valve opening start timing of the fuel injection device and stabilizing a fuel injection quantity. Therefore, the control device for the fuel injection device of the present invention is a control device for a plurality of fuel injection devices each including: a valve body that opens a fuel passage by separating from a valve seat; a movable element that causes an opening/closing operation of the valve body; and a stator that attracts the movable element by a drive current flowing through a coil. This control device includes a control unit that controls the energization time of the drive current by a pulse width of a drive command pulse. The control unit estimates a valve opening start timing having a correlation with a detected valve closing completion timing. Further, the pulse width of the drive command pulse is corrected based on the valve opening start timing.

7 Claims, 10 Drawing Sheets

(51) Int. Cl.
  *F02M 51/06* (2006.01)
  *F02D 41/34* (2006.01)
(52) U.S. Cl.
  CPC ............... *F02D 2041/2027* (2013.01); *F02D 2041/2051* (2013.01); *F02D 2041/2055* (2013.01); *F02D 2041/2058* (2013.01); *F02D 2041/2062* (2013.01)

(56) References Cited

U.S. PATENT DOCUMENTS

| | | | |
|---|---|---|---|
| 2016/0237937 A1* | 8/2016 | Kusakabe | F02D 41/247 |
| 2017/0218876 A1 | 8/2017 | Kusakabe et al. | |
| 2017/0335787 A1* | 11/2017 | Aono | F02D 41/2467 |
| 2018/0112614 A1* | 4/2018 | Makino | F02D 41/20 |
| 2019/0195163 A1* | 6/2019 | Satake | F02D 41/20 |
| 2020/0088123 A1* | 3/2020 | Itaba | F02D 41/3005 |

FOREIGN PATENT DOCUMENTS

| | | |
|---|---|---|
| JP | 2015-224621 A | 12/2015 |
| JP | 2017-31889 A | 2/2017 |
| JP | 2018-35728 A | 3/2018 |
| WO | WO 2015/015541 A1 | 3/2017 |

OTHER PUBLICATIONS

Japanese-language Written Opinion (PCT/ISA/237) issued in PCT Application No. PCT/JP2020/004480 dated May 19, 2020 (four (4) pages).

* cited by examiner

CHARACTERISTICS WHEN VARIATIONS IN
SPRING LOAD AND PRELIMINARY STROKE OVERLAP

CORRECTION RESULT OF INJECTION QUANTITY VARIATION

DIFFERENCE OF VALVE CLOSING COMPLETION TIMING [ms]

CONTROL DEVICE FOR FUEL INJECTION DEVICE

TECHNICAL FIELD

The present invention relates to a control device that controls a fuel injection quantity of a fuel injection device.

BACKGROUND ART

In recent years, there is a request for reduction of a minimum injection quantity of a fuel injection valve, and it is necessary to reduce a variation in the fuel injection quantity for each injector in order to satisfy the request. Further, the variation in the fuel injection quantity variation is caused by variations in valve opening timing and valve closing timing.

The variation in the valve closing timing has the dominant influence on the fuel injection quantity, and thus, only the valve closing timing has been conventionally detected and corrected. However, it is necessary to detect and correct the valve opening timing as the request for the reduction of the minimum injection quantity becomes stricter. Therefore, a method of detecting the valve opening timing has been proposed.

PTL 1 discloses a drive control device of an electromagnetic valve that performs opening/closing control of the electromagnetic valve which controls a flow rate of a fluid, such as a fuel injection valve and an exhaust gas recirculation control valve mounted on an internal combustion engine. In this drive control device of the electromagnetic valve, the valve opening timing is estimated from an inflection point of a current during valve opening.

CITATION LIST

Patent Literature

PTL 1: JP 2014-234922 A

SUMMARY OF INVENTION

Technical Problem

However, in the technique disclosed in PTL 1, a high voltage of several tens of volts is applied to a DI injector to cause the current to flow rapidly, and thus, it is considered that magnetic saturation occurs in a solenoid and a current change due to the valve opening does not occur. Therefore, it is difficult to detect a valve opening start timing of the fuel injection valve from the inflection point of the current during the valve opening.

In consideration of the above problems, an object of the present invention is to provide a control device for a fuel injection device capable of detecting a valve opening start timing of a fuel injection device and stabilizing a fuel injection quantity.

Solution to Problem

In order to solve the above problems and achieve the object of the present invention, a control device for a fuel injection device of the present invention is a control device for a fuel injection device including: a valve body that opens a fuel passage by separating from a valve seat; a movable element that causes an opening/closing operation of the valve body; and a stator that attracts the movable element by a drive current flowing through a coil. This control device includes a control unit that controls the energization time of the drive current by a pulse width of a drive command pulse. The control unit of the control device estimates a valve opening start timing having a correlation with a detected valve closing completion timing. Further, the pulse width of the drive command pulse is corrected based on the valve opening start timing.

Advantageous Effects of Invention

According to the control device for the fuel injection device having the above configuration, it is possible to detect the valve opening start timing of the fuel injection device and stabilize the fuel injection quantity.

Incidentally, other objects, configurations, and effects which have not been described above will become apparent from an embodiment to be described hereinafter.

DESCRIPTION OF EMBODIMENTS

Figure 1:
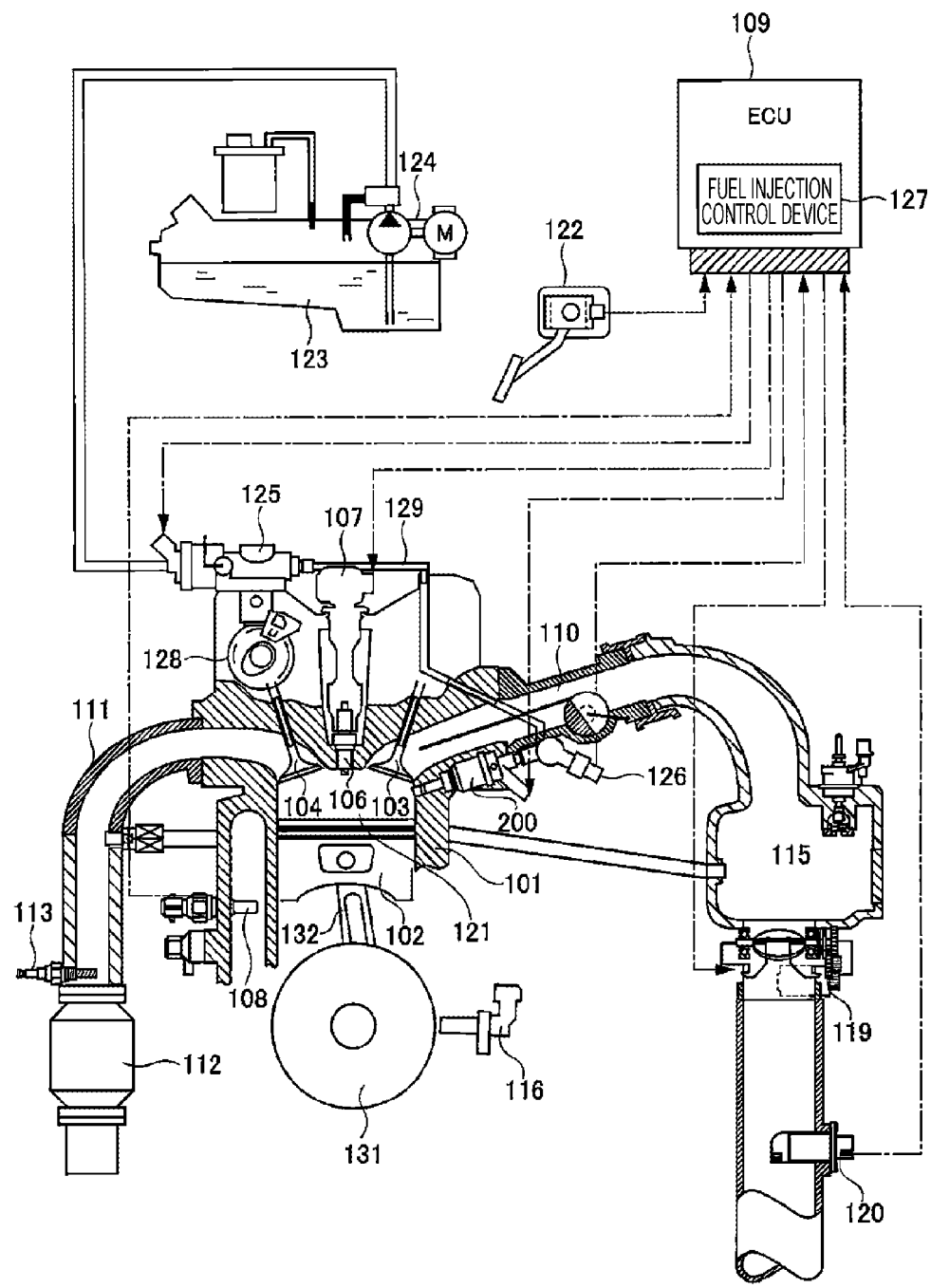
FIG. 1 is an overall configuration diagram illustrating a basic configuration example of an internal combustion engine equipped with a control device for a fuel injection device according to an embodiment of the present invention.

Hereinafter, a control device for a fuel injection device according to an embodiment of the present invention will be described. Incidentally, common members in the drawings will be denoted by the same reference signs.

[Internal Combustion Engine System]

First, a configuration of an internal combustion engine system equipped with a control device for a fuel injection device according to the present embodiment will be described. FIG. 1 is an overall configuration diagram of the internal combustion engine system equipped with the control device for the fuel injection device according to the embodiment.

An internal combustion engine (engine) 101 illustrated in FIG. 1 is a four-cycle engine that repeats four strokes including an intake stroke, a compression stroke, a combustion (expansion) stroke, and an exhaust stroke, and is, for example, a multi-cylinder engine including four cylinders. Incidentally, the number of cylinders included in the internal combustion engine 101 is not limited to four, and may include six or eight or more cylinders.

The internal combustion engine 101 includes a piston 102, an intake valve 103, and an exhaust valve 104. Air (intake air) sucked to the internal combustion engine 101 passes through an air flow meter (AFM) 120 that detects the amount of inflow air, and a flow rate thereof is adjusted by a throttle valve 119. The air that has passed through the throttle valve 119 is sucked into a collector 115 that is a branch portion, and then, is supplied to a combustion chamber 121 of each cylinder through an intake pipe 110 and an intake valve 103 provided for each cylinder.

On the other hand, fuel is supplied from a fuel tank 123 to a high-pressure fuel pump 125 by a low-pressure fuel pump 124, and a pressure of the fuel is increased to a pressure necessary for fuel injection by the high-pressure fuel pump 125. That is, the high-pressure fuel pump 125 moves a plunger, provided in the high-pressure fuel pump 125, up and down by power transmitted from an exhaust camshaft (not illustrated) of an exhaust cam 128 to pressurize (step up) the fuel in the high-pressure fuel pump 125.

An on-off valve driven by a solenoid is provided at an intake port of the high-pressure fuel pump 125, and the solenoid is connected to a control device 127 (hereinafter, referred to as "fuel injection control device 127") for the fuel injection device provided in an engine control unit (ECU) 109. The fuel injection control device 127 controls the solenoid based on a control command from the ECU 109, and drives the on-off valve such that the pressure (fuel pressure) of the fuel discharged from the high-pressure fuel pump 125 becomes a desired pressure.

The fuel whose pressure has been stepped up by the high-pressure fuel pump 125 is sent to a fuel injection device 200 via a high-pressure fuel pipe 129. The fuel injection device 200 directly injects the fuel into the combustion chamber 121 based on a command from the fuel injection control device 127. The fuel injection device 200 operates the valve body to inject the fuel as a coil 208, which will be described later, is supplied (energized) with a drive current.

In addition, the internal combustion engine 101 is provided with a fuel pressure sensor 126 that measures the fuel pressure in the high-pressure fuel pipe 129. The ECU 109 transmits a control command for setting the fuel pressure in the high-pressure fuel pipe 129 to a desired pressure to the fuel injection control device 127 based on a measurement result of the fuel pressure sensor 126. That is, the ECU 109 performs so-called feedback control to set the fuel pressure in the high-pressure fuel pipe 129 to the desired pressure.

Furthermore, the combustion chamber 121 of the internal combustion engine 101 is provided with an ignition plug 106, an ignition coil 107, and a water temperature sensor 108. The ignition plug 106 exposes an electrode portion in the combustion chamber 121, and ignites an air-fuel mixture in which the intake air and the fuel are mixed in the combustion chamber 121 by discharging. The ignition coil 107 creates a high voltage for discharging at the ignition plug 106. The water temperature sensor 108 measures the temperature of cooling water for cooling the cylinder of the internal combustion engine 101.

The ECU 109 performs energization control of the ignition coil 107 and ignition control using the ignition plug 106. The air-fuel mixture in which the intake air and the fuel are mixed in the combustion chamber 121 is burned by a spark emitted from the ignition plug 106, and the piston 102 is pushed down by this pressure.

An exhaust gas generated by the combustion is discharged to an exhaust pipe 111 through the exhaust valve 104. Further, the exhaust pipe 111 is provided with a three-way catalyst 112 and an oxygen sensor 113. The three-way catalyst 112 purifies harmful substances such as nitrogen oxides (NOx) contained in the exhaust gas. The oxygen sensor 113 detects the concentration of oxygen contained in the exhaust gas and outputs this detection result to the ECU 109. The ECU 109 performs feedback control based on the detection result of the oxygen sensor 113 such that a fuel injection quantity supplied from the fuel injection device 200 becomes a target air-fuel ratio.

In addition, a crankshaft 131 is connected to the piston 102 via a connecting rod 132. Further, a reciprocating motion of the piston 102 is converted into a rotational motion by the crankshaft 131. Further, a crank angle sensor 116 is attached to the crankshaft 131. The crank angle sensor 116 detects a rotation and a phase of the crankshaft 131 and outputs these detection results to the ECU 109. The ECU 109 can detect a rotational speed of the internal combustion engine 101 based on the output of the crank angle sensor 116.

Signals from the crank angle sensor 116, the air flow meter 120, the oxygen sensor 113, an accelerator opening degree sensor 122 indicating an opening degree of an accelerator operated by a driver, the fuel pressure sensor 126, and the like are input to the ECU 109.

The ECU 109 calculates a required torque of the internal combustion engine 101 based on a signal supplied from the accelerator opening degree sensor 122, and determines whether or not the engine is in an idle state. In addition, the ECU 109 calculates an intake air quantity necessary for the internal combustion engine 101 from the required torque or the like, and outputs an opening degree signal corresponding to the calculated intake air quantity to the throttle valve 119.

In addition, the ECU 109 includes a rotation speed detection unit that calculates a rotation speed (hereinafter, referred to as an engine speed) of the internal combustion engine 101 based on a signal supplied from the crank angle sensor 116. Furthermore, the ECU 109 includes a warm-up determination unit that determines whether the three-way catalyst 112 is in a warm-up state based on the temperature of the cooling water obtained from the water temperature sensor 108, the elapsed time since the start of the internal combustion engine 101, and the like.

The fuel injection control device 127 calculates a fuel quantity (target injection quantity) corresponding to the intake air quantity, and outputs a fuel injection signal corresponding to the calculated fuel quantity to the fuel injection device 200. Furthermore, the fuel injection control device 127 outputs an energization signal to the ignition coil 107 and outputs an ignition signal to the ignition plug 106.
[Configuration of Fuel Injection Device]

Next, a configuration of the fuel injection device 200 illustrated in FIG. 1 will be described with reference to FIG. 2.

Figure 2:
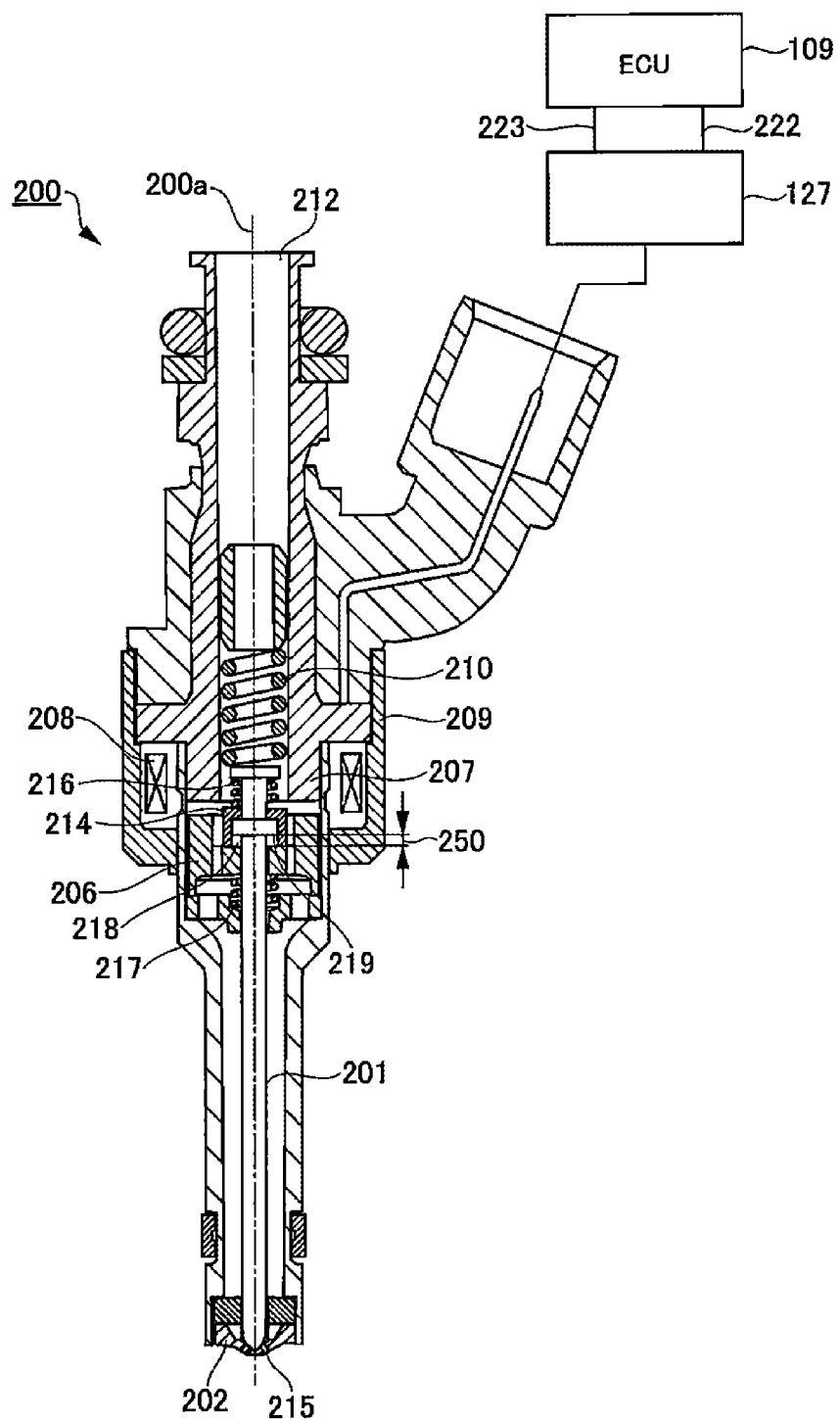
FIG. 2 is a cross-sectional view illustrating the fuel injection device according to the embodiment of the present invention.

FIG. 2 is a cross-sectional view illustrating the fuel injection device 200 illustrated in FIG. 1.

As illustrated in FIG. 2, the fuel injection device 200 includes a fuel supply unit 212 that supplies fuel, a valve seat 202 having a fuel injection hole 215 serving as a passage of the fuel, and a movable iron core (movable element) 206 that drives the valve body 201. In the present embodiment, the description is given by exemplifying an electromagnetic fuel injection device for an internal combustion engine using gasoline as fuel.

In the fuel injection device 200, the fuel supply unit 212 is formed on the upper end side of the drawing, the fuel injection hole 215 and the valve seat 202 are formed on the lower end side, and the movable iron core 206, the valve body 201, and an intermediate member 214 are disposed between the fuel supply unit 212 and the valve seat 202.

In the fuel injection device 200, an end portion on a side (the fuel supply unit 212 side) opposite to the fuel injection hole 215 and the valve seat 202 is connected to the high-pressure fuel pipe 129 (see FIG. 1) (not illustrated). In the fuel injection device 200, an end portion on a side (the fuel injection hole 215 side) opposite to the fuel supply unit 212 is inserted into an attachment hole (insertion hole) formed in a member (a cylinder block, a cylinder head, or the like) forming the combustion chamber 121 (see FIG. 1).

The fuel injection device 200 receives supply of fuel from the high-pressure fuel pipe 129 (see FIG. 1) through the fuel supply unit 212, and injects the fuel from a distal end portion of the valve seat 202 into the combustion chamber 121 (see FIG. 1). A fuel passage is formed inside the fuel injection device 200 such that the fuel flows substantially along a central axis 100a of the fuel injection device 200 from a proximal end portion on the fuel supply unit 212 side to a distal end portion on the fuel injection hole 215 side.

The coil 208 is disposed between the fixed iron core (stator) 207 and a housing 209. The fixed iron core 207, the coil 208, and the housing 209 form an electromagnet. In a valve-closed state in which the coil 208 is not energized, the valve body 201 abuts on the valve seat 202 by a force, obtained by subtracting a biasing force of a third spring member 217 from biasing forces of a first spring member 210 and a second spring member 216 that bias the valve body 201 in a valve closing direction. This state is referred to as a stable valve-closed state (valve-closing standby state). In the stable valve-closed state, the movable iron core 206 abuts on the intermediate member 214 and is disposed at a valve-closed position. The valve body 201 is driven via a transmission surface 219 that transmits a load from the movable iron core 206.

In the stable valve-closed state, the intermediate member 214 is biased to the downstream side (the valve seat 202 side or in the valve closing direction) by the second spring member 216, and comes into contact with the valve body 201 to be stationary. The movable iron core 206 is biased to the upstream side (the fixed iron core 207 side or in a valve opening direction) by the third spring member 217, and comes into contact with the intermediate member 214. Since the biasing force of the second spring member 216 is larger than the biasing force of the third spring member 217, a gap 250 is generated between the valve body 201 and the movable iron core 206.

The fuel injection control device 127 and the engine control device (ECU) 109 are connected to the fuel injection device 200. The fuel injection control device 127 includes a circuit that receives a drive command pulse (injection pulse) from the ECU 109 and energizes the fuel injection device 200 with a drive current (drive voltage).

Incidentally, the ECU 109 and the fuel injection control device 127 may be configured as an integrated component.

At least the fuel injection control device 127 is a device that generates a drive voltage of the fuel injection device 200, and may be integrated with the ECU 109 or may be configured as a single device.

The ECU 109 acquires signals indicating the engine state from various sensors, and calculates appropriate drive command pulse (injection pulse) width and injection timing according to an operating condition of the internal combustion engine. The drive command pulse output from the ECU 109 is input to the fuel injection control device 127 via a signal line 223.

The fuel injection control device 127 controls the drive voltage applied to the coil 208 and supplies the drive current. The ECU 109 communicates with the fuel injection control device 127 via a communication line 222, and can switch the drive current generated by the fuel injection control device 127 according to the pressure of fuel supplied to the fuel injection device 200 and the operating condition. The fuel injection control device 127 can change a control constant by communication with the ECU 109, and a current waveform changes according to the control constant.
[Configuration of Fuel Injection Control Device]

Next, a configuration of the fuel injection control device 127 will be described with reference to FIG. 3.

Figure 3:
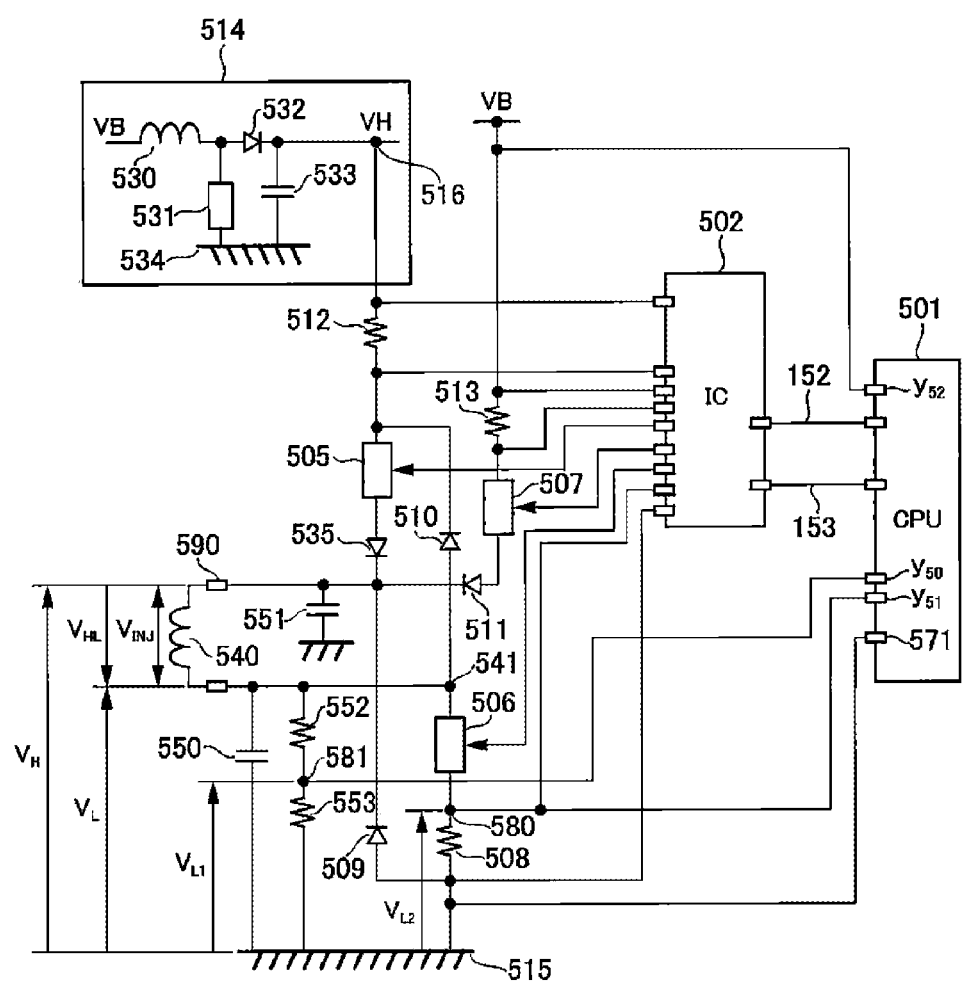
FIG. 3 is a view illustrating details of a drive circuit and an engine control unit (ECU) of the fuel injection device according to the embodiment of the present invention.

FIG. 3 is a diagram illustrating details of a drive circuit and the ECU 109 of the fuel injection control device 127.

The ECU 109 (see FIG. 2) incorporates a CPU 501. The CPU 501 acquires various signals indicating the engine state from the fuel pressure sensor 126, the air flow meter 120, the oxygen sensor 113, the crank angle sensor 116, and the like. Further, in response to these signals, the CPU 501 performs computation of a drive command pulse (injection pulse) width, configured for control of a fuel injection quantity to be injected from the fuel injection device 200 according to the operating condition of the internal combustion engine, and an injection timing.

In addition, the CPU 501 also performs computation of appropriate pulse width of the drive command pulse and injection timing according to the operating condition of the internal combustion engine, and outputs the drive command pulse to a drive IC 502 of the fuel injection device 200 via the signal line 223. The CPU 501 illustrates a specific example of a control unit according to the present invention. Incidentally, the magnitude of the injection quantity is determined by the pulse width of the drive command pulse. Thereafter, the energization and non-energization of switching elements 505, 506 and 507 are switched by the drive IC 502 to supply the drive current to a fuel injection device 200.

The switching element 505 is connected between a high voltage source higher than a voltage source VB, input to the drive circuit of the fuel injection control device 127, and a terminal of a solenoid 540 of the fuel injection device 200 on the high voltage side. The switching elements 505, 506, and 507 are configured using, for example, a field effect transistor (FET), a transistor, or the like, and can switch energization and non-energization with respect to the fuel injection device 200.

A step-up voltage VH, which is an initial voltage value of the high voltage source, is 65 V, for example, and is generated by stepping up the battery voltage using a step-up circuit 514. The step-up circuit 514 includes, for example, a coil 530, a transistor 531, a diode 532, and a capacitor 533.

In the step-up circuit 514, a battery voltage VB flows toward a ground potential 534 when the transistor 531 is turned on. On the other hand, when the transistor 531 is turned off, a high voltage generated in the coil 530 is rectified through the diode 532, and charges are accumulated in the capacitor 533. Further, this transistor is repeatedly turned on and off until reaching a step-up voltage VH, thereby increasing a voltage of the capacitor 533. The transistor 531 is connected to the IC 502 or the CPU 501, and the step-up voltage VH output from the step-up circuit 514 is detected by the IC 502 or the CPU 501. Incidentally, the step-up circuit 514 may include a DC/DC converter or the like.

The switching element 507 is connected between a low-voltage source and a high-voltage terminal of the solenoid 540. The low voltage source VB is, for example, the battery voltage, and the voltage value thereof is about 12 to 14 V. The switching element 506 is connected between a terminal of the fuel injection device 200 on the low voltage side and the ground potential 515.

The drive IC 502 detects a value of the current flowing in the fuel injection device 200 using resistors 508, 512 and 513 for current detection, switches energization and non-energization of the switching elements 505, 506 and 507 according to the detected current value, and generates a desired drive current. Diodes 509 and 510 apply a reverse voltage to the solenoid 540 of the fuel injection device 200 and to rapidly reduce the current being supplied to the solenoid 540.

The CPU 501 performs communication with the drive IC 502 via the communication line 222 and can switch the pressure of fuel supplied to the fuel injection device 200 and the drive current generated by the drive IC 502 depending on operating conditions. In addition, both ends of each of the resistors 508, 512 and 513 are connected to A/D conversion ports of the IC 502 so that the voltage applied between both ends of each of the resistors 508, 512 and 513 can be detected by the IC 502.

[Operation of Fuel Injection Device]

Next, an operation of the fuel injection device 200 will be described with reference to FIG. 4.

Figure 4:
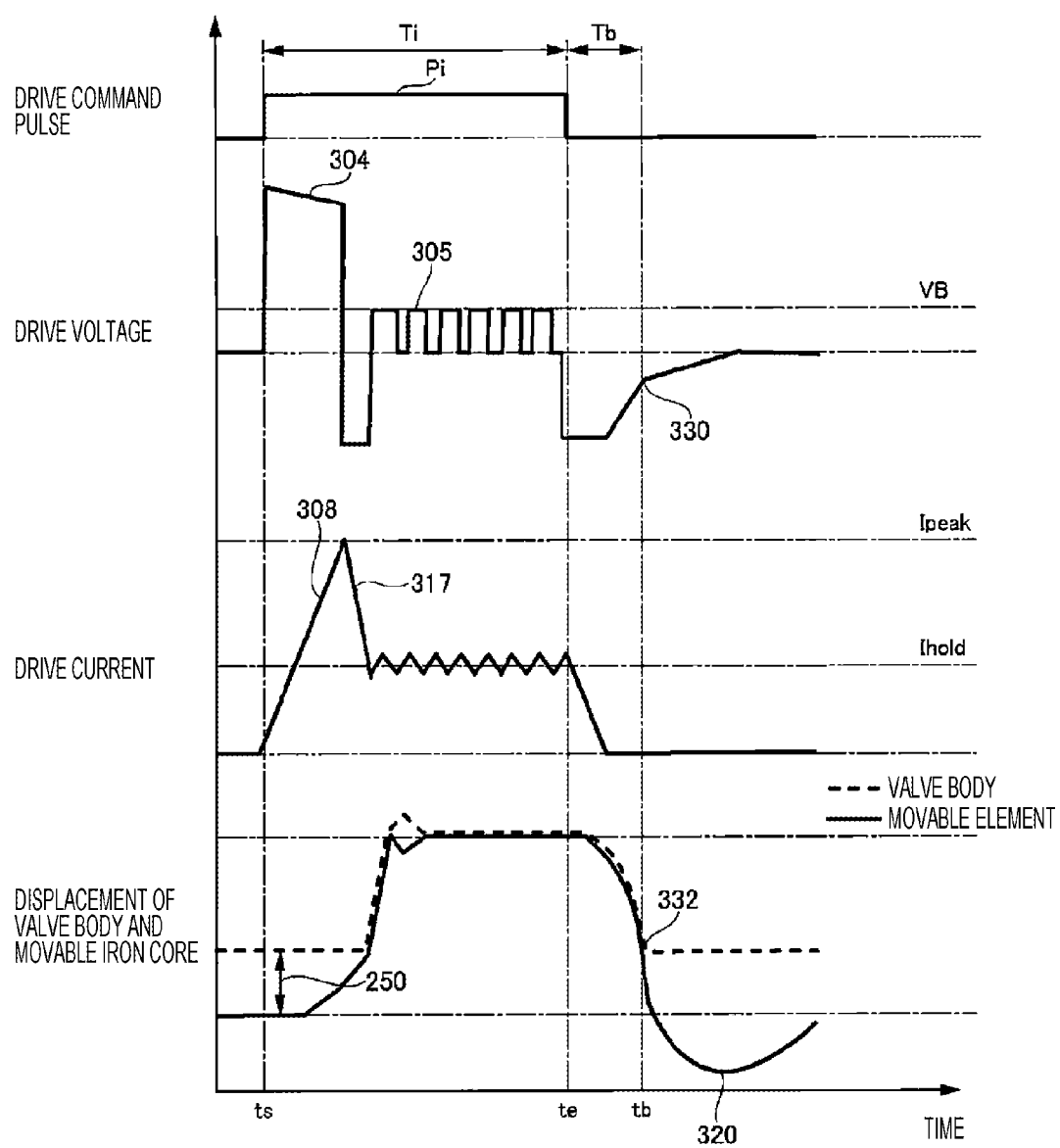
FIG. 4 is a graph illustrating a drive command pulse (injection pulse) Pi, a drive voltage, a drive current, a valve body displacement, and a movable iron core displacement of the fuel injection device illustrated in FIG. 2.

FIG. 4 is a graph illustrating a drive command pulse (injection pulse) Pi, a drive voltage, a drive current, a valve body displacement, and a movable iron core displacement.

As illustrated in FIG. 4, when the drive command pulse Pi is input at time ts, a high voltage 304 is applied from a high voltage source stepped up to a voltage higher than the battery voltage VB, and the supply of current to the coil 208 is started.

After energizing the coil 208, a magnetomotive force is generated by an electromagnet constituted by the fixed iron core 207, the coil 208, and the housing 209. Due to this magnetomotive force, a magnetic flux flows to circulate in a magnetic path formed to surround the coil 208 by the fixed iron core 207, the housing 209, and the movable iron core 206. At this time, a magnetic attractive force acts between the movable iron core 206 and the fixed iron core 207, and the movable iron core 206 and the intermediate member 214 are displaced toward the fixed iron core 207. Thereafter, the movable iron core 206 is displaced until the transmission surface 219 of the valve body 201 and a transmission surface 218 of the movable iron core 206 abut on each other. Incidentally, the valve body 201 continues to maintain the abutment state with the valve seat 202.

When the movable iron core 206 is displaced by the gap 250 generated between the valve body 201 and the movable iron core 206 so that the transmission surface 219 of the valve body 201 and the transmission surface 218 of the movable iron core 206 collide with each other, the valve body 201 is pulled up to the upstream side by the energy of the movable iron core 206, and the valve body 201 is separated from the valve seat 202. Accordingly, a gap is formed in the valve seat portion, the fuel passage is opened, and the fuel is injected through the fuel injection hole 215. The valve body 201 is steeply displaced by the movable iron core 206 having kinetic energy.

When the movable iron core 206 abuts on the fixed iron core 207, the valve body 201 is displaced to the upstream side, and the movable iron core 206 is displaced downward. When the fixed iron core 207 and the movable iron core 206 collide with each other, the valve body 201 and the movable iron core 206 are separated from each other, and the movable iron core 206 is displaced to the downstream side, but eventually becomes stationary and stable at a target lift position. This state is referred to as a stable valve-open state.

On the other hand, when a current value is steeply raised as indicated by 308 with the application of the high voltage 304 and reaches a predetermined peak current value Ipeak, the application of the high voltage 304 is stopped to make the voltage to be applied 0 V or less such that the current value is lowered as in a current profile 317. Thereafter, the application of the battery voltage VB and the application of 0 V are repeated (305), and control is performed such that a hold current value Ihold is obtained.

Subsequently, when the drive command pulse Pi is turned off at time te, the current supply to the coil 208 is cut off, the magnetic flux generated in the magnetic circuit disappears so that the magnetic attractive force also disappears. As a result, the movable iron core 206 that has lost the magnetic attractive force is pushed back to a closed position where the valve body 201 comes into contact with the valve seat 202 by the load of the first spring member 210 and the force caused by the fuel pressure.

The biasing force of the first spring member 210 acting on the valve body 201 is transmitted to the movable iron core 206 via the transmission surface 219 on the valve body 201 side and the transmission surface 218 on the movable iron core 206 side. When a required valve closing time Tb from the time to at which the drive command pulse Pi is turned off to time tb at which the valve closing is completed elapses, the valve body 201 comes into contact with the valve seat 202 at the time tb.

After the valve body 201 comes into contact with the valve seat 202, the transmission surface 218 on the movable iron core 206 side is separated from the transmission surface 219 on the valve body 201 side, and continues to move in the downward direction (valve closing direction). After the time tb at which the valve closing is completed, the movable iron core 206 and the valve body 201 are separated from each other as indicated by 332. At this time, a change such as bending appears in the drive voltage as indicated by an inflection point 330. This change can make detection of tb and Tb.

At the time of closing the fuel injection device 200, the third spring member 217 shifts from extension to compression when the valve body 201 collides with the valve seat 202, a movement direction of the movable iron core 206 is reversed to change the acceleration, so that the inductance of the coil 208 changes. That is, when the fuel injection device 200 is closed, the drive current flowing through the coil 208 is cut off, and a counter electromotive force is applied to the coil 208. Further, the counter electromotive force gradually decreases as the drive current converges, and thus, the inductance changes when the counter electromotive force decreases, so that the inflection point 330 is generated in the drive voltage.

The inflection point 330 is a valve closing completion timing of the fuel injection device 200. The inflection point 330 appears as an extreme value (maximum value or minimum value) when time-series data of the drive voltage applied to the coil 208 is subjected to second-order differentiation. Therefore, the inflection point 330 can be identified by detecting the extreme value of the time-series data of the drive voltage.

[Method of Detecting Valve Closing Completion Timing]

Next, a method of detecting the valve closing completion timing will be described with reference to FIG. 5.

Figure 5:
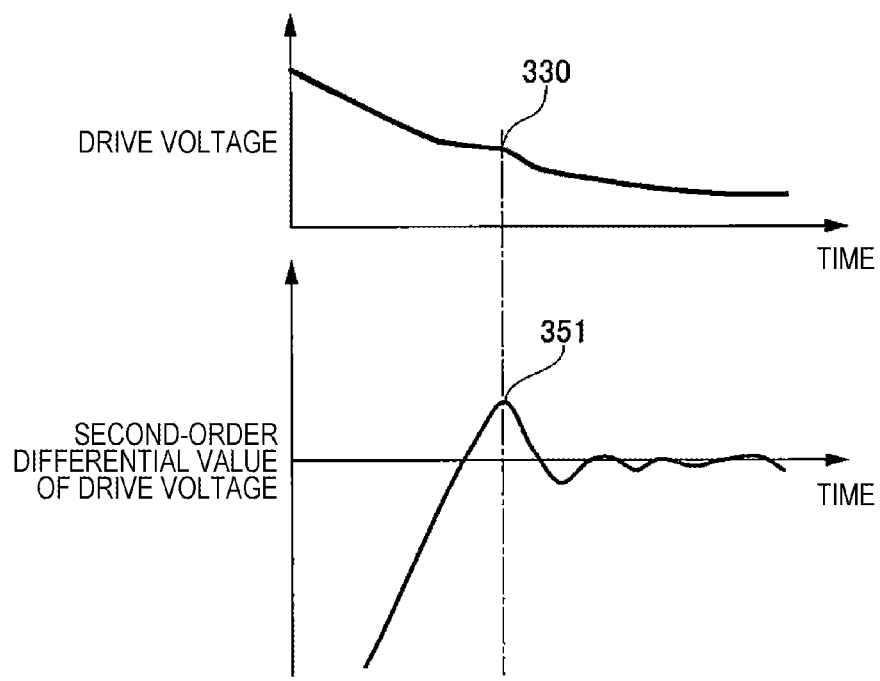
FIG. 5 is a graph for describing a method of detecting an inflection point of a drive voltage applied to the fuel injection device illustrated in FIG. 2.

FIG. 5 is a graph for describing a method of detecting an inflection point of a drive voltage applied to the fuel injection device 200.

FIG. 5 illustrates time-series data of the drive voltage and a second-order differential value thereof during a valve closing operation of the fuel injection device 200.

Figure 8:
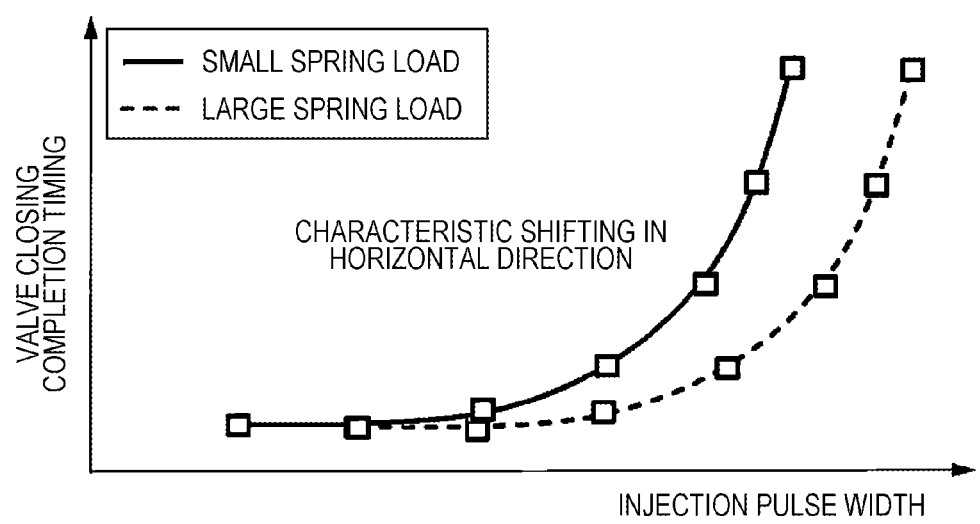
FIG. 8 is a graph for describing influence of the spring load on a valve closing completion timing in the fuel injection device illustrated in FIG. 2.

Incidentally, the drive voltage illustrated in FIG. 8 is reversed in positive and negative with respect to FIG. 4. Reference sign 351 illustrated in FIG. 8 denotes an extreme value corresponding to the inflection point 330.

Incidentally, when an S/N ratio of the drive voltage is low and the noise level thereof is large, it is difficult to detect the extreme value from a result of the second-order differentiation of the time-series data of the drive voltage. Therefore, a desired extreme value can be detected by applying a low-pass filter or the like to the drive voltage and performing second-order differentiation on the smoothed time-series data. The second-order differential value of the drive voltage illustrated in FIG. 8 is obtained by applying the filter to the drive voltage and performing the second-order differentiation on the smoothed data.

If the second-order differentiation is performed on the time-series data of the drive voltage from a time point at which the injection pulse is turned off, there is a possibility that the time at which the voltage is switched (for example, the time at which the counter electromotive force is applied after the drive voltage is turned off or the like) appears as an extreme value. Then, it is difficult to accurately identify an inflection point generated by an acceleration change of the movable iron core 206.

Therefore, the time-series data of the drive voltage to be subjected to the second-order differentiation is desirably time-series data of the drive voltage after a lapse of a certain period of time since the injection pulse is turned off (in other words, since the drive voltage or drive current is turned off). That is, the time-series data of the drive voltage to be subjected to the second-order differentiation is desirably the time-series data of the drive voltage after the application of the counter electromotive force since the drive voltage is turned off.

Next, injection quantity characteristics will be described with reference to FIG. 6.

Figure 6:
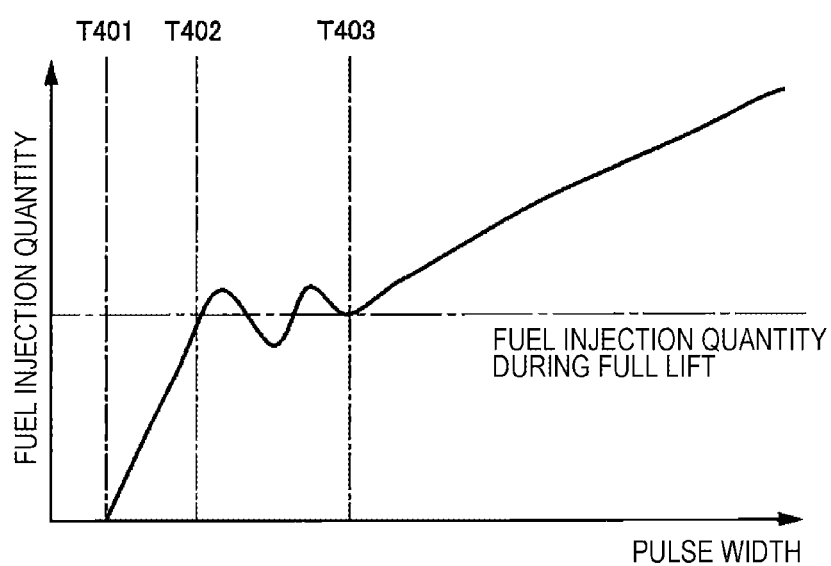
FIG. 6 is a graph illustrating the relationship between an injection pulse width and a fuel injection quantity of the fuel injection device illustrated in FIG. 2.

FIG. 6 is a graph illustrating the relationship between an injection pulse width of the fuel injection device 200 and a fuel injection quantity, where the horizontal axis represents the injection pulse width and the vertical axis represents the fuel injection quantity per time.

As illustrated in FIG. 6, the lift amount of the valve body 201 increases based on the supply time of a peak current due to the application of a high voltage in a period from time T401 at which the valve body 201 starts to open to time T402 at which the valve body 201 reaches full lift, so that the fuel injection quantity increases. A slope of the fuel injection quantity in this period (a fuel injection quantity increase rate from T401 to T402) is determined depending on a valve opening speed of the valve body 201. Since the power supply for supplying the peak current is the high voltage 304 (see FIG. 4), the slope of the fuel injection quantity is steep.

Thereafter, the movable iron core 206 collides with the fixed iron core 207, and the valve body 201 starts a bouncing operation, so that the fuel injection quantity is disturbed (T402 to T403). Such a bouncing operation period is not generally used as a period during which fuel injection is performed because of a large characteristic variation per fuel injection valve, poor reproducibility per injection operation, and the like. That is, the injection pulse is not set during the bouncing operation period.

Since the valve body 201 after T403 at which the bouncing converges maintains the full lift position, the fuel injection quantity has an increasing characteristic of a slope proportional to the length of the injection pulse.

[Spring Load and Displacement of Movable Element]

Next, the relationship between a spring load and the displacement of the movable iron core 206 will be described with reference to FIG. 7.

Figure 7:
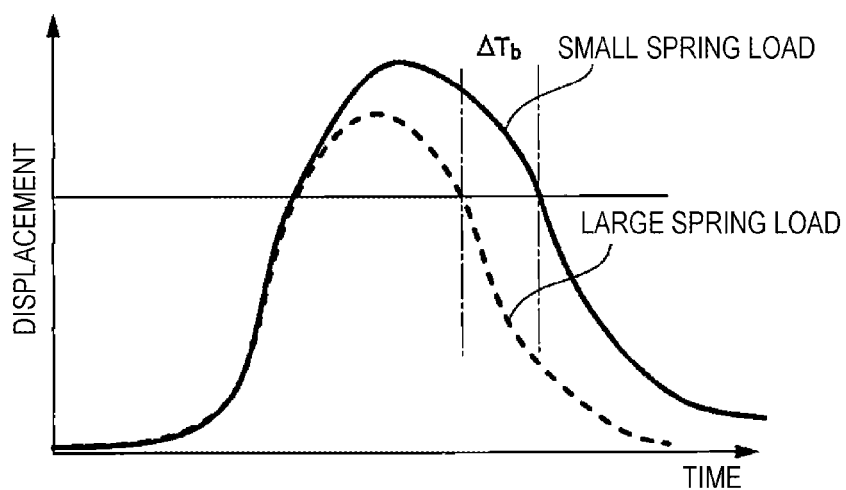
FIG. 7 is a graph for describing the relationship between a spring load and a displacement of a movable element in the fuel injection device illustrated in FIG. 2.

FIG. 7 is a graph for describing the relationship between the spring load and the displacement of the movable iron core 206 in the fuel injection device 200.

The spring load is a force obtained by subtracting the biasing force of the third spring member 217 from the biasing force of the first spring member 210 described above, and the spring load varies for each of the fuel injection devices. In addition, the spring load corresponds to a biasing force of a biasing member according to the present invention. The movable iron core 206 is not affected by the spring load until the transmission surface 219 of the valve body 201 and the transmission surface 218 of the movable iron core 206 abut on each other.

Therefore, if the injection pulse width, a preliminary stroke (the above-described gap 250), and the biasing force of the second spring member 216 are the same, a displacement amount of the movable iron core 206 is the same between a case where the spring load is small and a case where the spring load is large until the transmission surface 219 of the valve body 201 and the transmission surface 218 of the movable iron core 206 abut on each other. That is, when the preliminary stroke is the same, a valve opening start timing is substantially the same between the case where the spring load is small and the case where the spring load is large.

When the transmission surface 219 of the valve body 201 and the transmission surface 218 of the movable iron core 206 abut on each other, the movable iron core 206 moves in the valve opening direction against the spring load. Therefore, the displacement amount of the movable iron core 206 in the case where the spring load is small is larger than the displacement amount of the movable iron core 206 in the case where the spring load is large. In addition, the spring load urges the movement of the movable iron core 206 in the valve closing direction. Therefore, a valve closing completion timing in the case where the spring load is large is earlier by ΔTb than a valve closing completion timing in the case where the spring load is small.

[Influence of Spring Load on Valve Closing Completion Timing]

Next, the influence of the spring load on the valve closing completion timing will be described with reference to FIG. 8.

FIG. 8 is a graph for describing the influence of the spring load on the valve closing completion timing.

As illustrated in FIG. 8, if the injection pulse width and the preliminary stroke are the same (if there is no variation), the valve closing completion timing in the case where the spring load is large is earlier than the valve closing completion timing in the case where the spring load is small. In addition, when the valve closing completion timing in the case where the spring load is large is set to coincide with the valve closing completion timing in the case where the spring load is small, it is necessary to increase the injection pulse width in the case where the spring load is large. In this manner, when the spring load is different, there is a characteristic that the relationship between the valve closing completion timing and the injection pulse shifts in the horizontal direction.

[Preliminary Stroke and Displacement of Movable Element]

Next, the relationship between a preliminary stroke and the displacement of the movable iron core 206 will be described with reference to FIG. 9.

Figure 9:
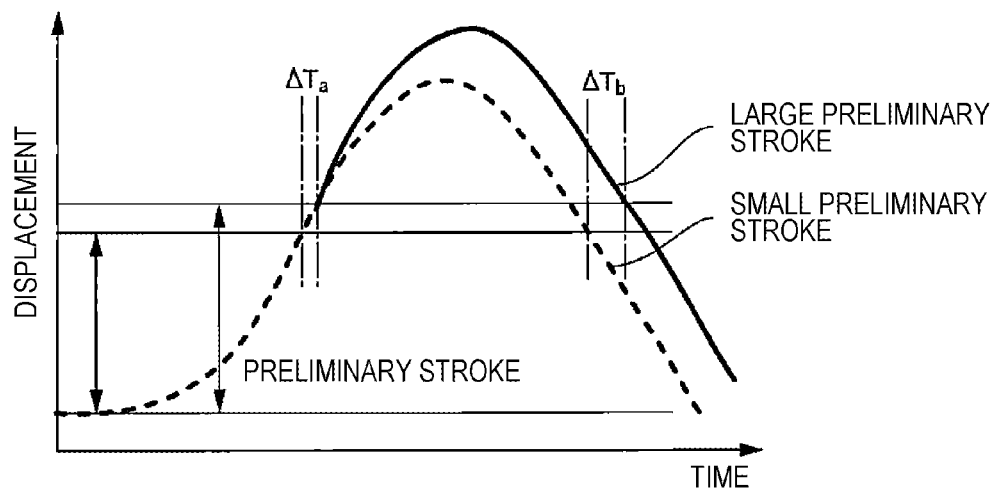
FIG. 9 is a graph for describing the relationship between a preliminary stroke and the displacement of the movable element in the fuel injection device illustrated in FIG. 2.

FIG. 9 is a graph for describing the relationship between the preliminary stroke and the displacement of the movable iron core 206 in the fuel injection device 200.

As described above, the preliminary stroke is the gap 250, and the preliminary stroke varies for each of the fuel injection devices. As illustrated in FIG. 9, if the injection pulse width is the same, the time required for abutment between the transmission surface 219 of the valve body 201 and the transmission surface 218 of the movable iron core 206 is shorter in a case where the preliminary stroke than in a case where the preliminary stroke is large. Therefore, a valve opening start timing in the case where the preliminary stroke is small is earlier by ΔTa than that in the case where the preliminary stroke is large.

On the other hand, the movable iron core 206 accelerates more in the case where the preliminary stroke is large than in the case where the preliminary stroke is small. As a result, a pressing force when the transmission surface 218 of the movable iron core 206 abuts on the transmission surface 219 of the valve body 201 becomes larger in the case where the preliminary stroke is large than in the case where the preliminary stroke is small.

Therefore, if the injection pulse width and the spring load are the same, a displacement amount of the movable iron core 206 in the case where the preliminary stroke is large is larger than a displacement amount of the movable iron core 206 in the case where the preliminary stroke is small. Accordingly, a valve closing completion timing in the case where the preliminary stroke is large is later by ΔTb than a valve closing completion timing in the case where the preliminary stroke is small.

[Influence of Preliminary Stroke on Valve Closing Completion Timing]

Next, the influence of the preliminary stroke on the valve closing completion timing will be described with reference to FIG. 10.

Figure 10:
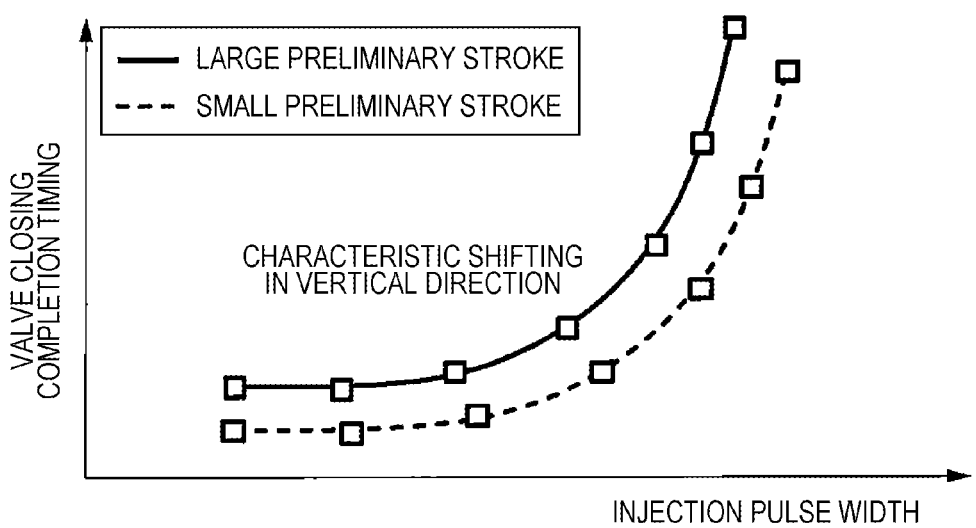
FIG. 10 is a graph for describing influence of the preliminary stroke on the valve closing completion timing in the fuel injection device illustrated in FIG. 2.

FIG. 10 is a graph for describing the influence of the preliminary stroke on the valve closing completion timing.

As illustrated in FIG. 10, if the injection pulse width and the spring load are the same (when there is no variation), the valve closing completion timing in the case where the preliminary stroke is small is earlier than the valve closing completion timing in the case where the preliminary stroke is large. In addition, when the preliminary strokes are different, the valve closing completion timing is affected by a variation in the valve opening start timing, so that there is a characteristic that the relationship between the valve closing completion timing and the injection pulse shifts in the vertical direction.

[Characteristics when Variations in Spring Load and Preliminary Stroke Overlap]

Next, characteristics when variations in the spring load and the preliminary stroke overlap will be described with reference to FIG. 11.

Figure 11:
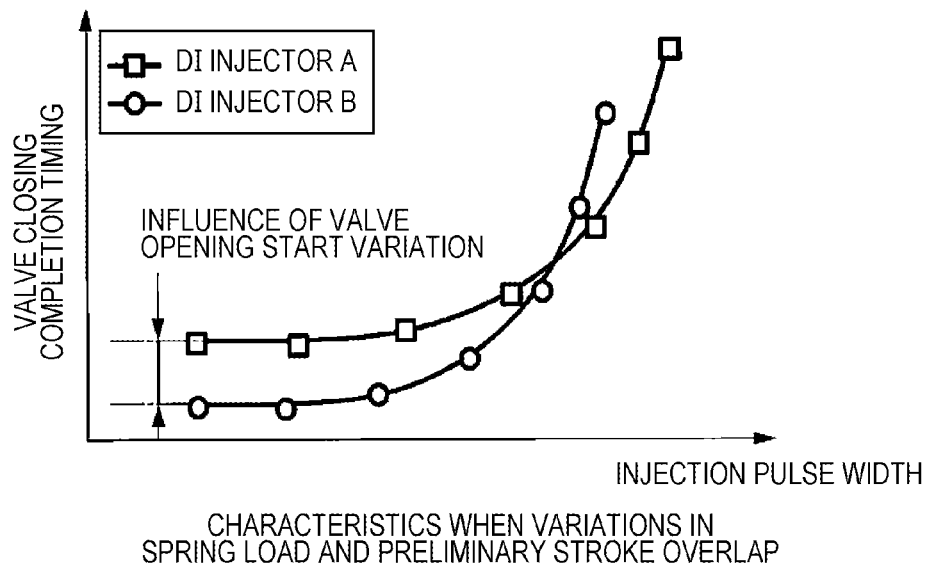
FIG. 11 is a graph illustrating characteristics when variations in the spring load and the preliminary stroke overlap in the fuel injection device illustrated in FIG. 2.

FIG. 11 is a graph illustrating the characteristics when the variations in the spring load and the preliminary stroke overlap.

A DI injector (fuel injection device) A and a DI injector (fuel injection device) B illustrated in FIG. 11 have different spring loads and preliminary strokes. Specifically, the preliminary stroke of the DI injector A is larger than the preliminary stroke of the DI injector B. In addition, the spring load of the DI injector A is larger than the spring load of the DI injector B.

In a case where the injection pulse width is relatively small, the drive voltage is cut off before the transmission surface 218 of the movable iron core 206 abuts on the transmission surface 219 of the valve body 201. Accordingly, the movable iron core 206 abuts on the transmission surface 219 of the valve body 201 with a constant-speed motion, and a variation in the preliminary stroke appears as a variation in the valve opening start timing. Therefore, a variation in the valve closing completion timing in the case where the injection pulse width is relatively small is greatly affected by the variation in the valve opening start timing.

On the other hand, in a case where the injection pulse width is relatively large, the drive voltage is cut off after the transmission surface 218 of the movable iron core 206 abuts on the transmission surface 219 of the valve body 201. Accordingly, the movable iron core 206 accelerates until abutting on the valve body 201, and a deviation occurs between the variation in the preliminary stroke and the variation in the valve opening start timing.

Furthermore, the magnetic attractive force acts between the movable iron core 206 and the fixed iron core 207 even when the movable iron core 206 is displaced against the spring load, and thus, a deformation amount of the spring (first spring member 210) becomes relatively large, and the influence of the spring load on the valve closing completion timing becomes large. Therefore, the variation in the valve closing completion timing in the case where the injection pulse width is relatively large intertwines with the influence of the variations in the spring load and the preliminary stroke.

[Relationship Between Injection Pulse Width and Valve Closing Completion Timing]

Next, the relationship between the injection pulse width and the valve closing completion timing will be described with reference to FIGS. 12 and 13.

Figure 12:
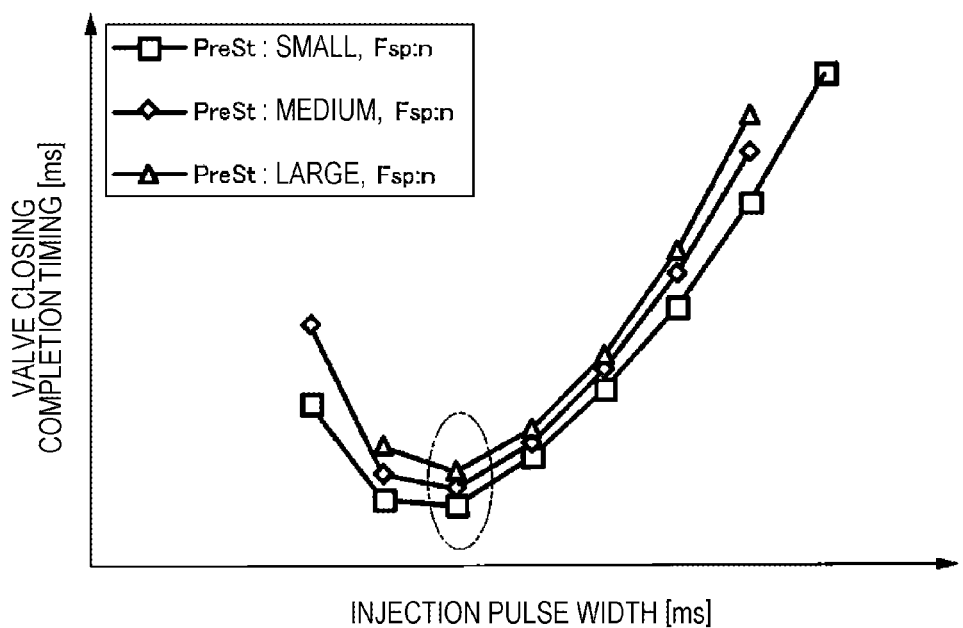
FIG. 12 is a graph for describing the relationship between the injection pulse width and the valve closing completion timing in the fuel injection device illustrated in FIG. 2.
Figure 13:
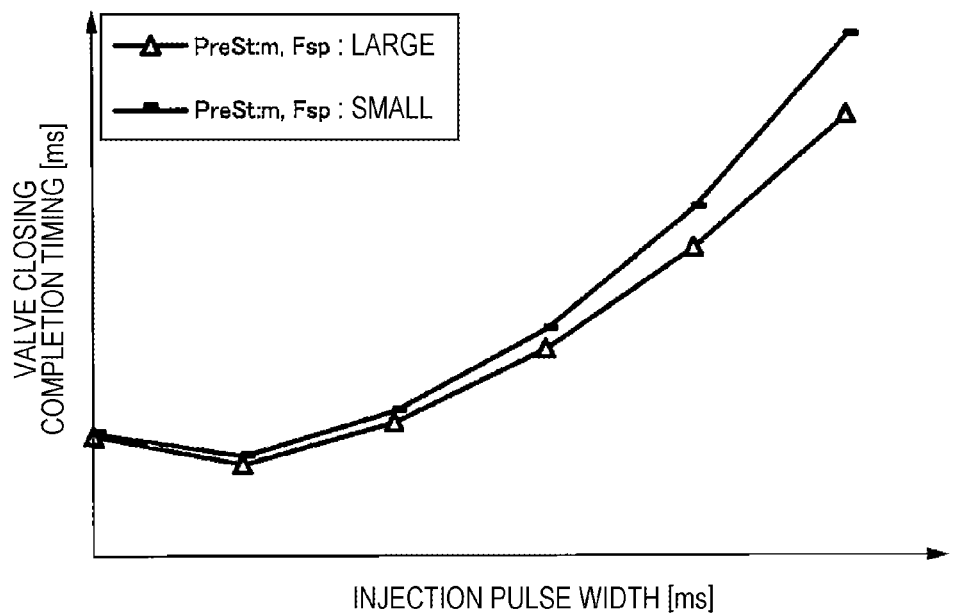
FIG. 13 is a graph for describing the relationship between the injection pulse width and the valve closing completion timing in the fuel injection device illustrated in FIG. 2.

FIGS. 12 and 13 are graphs for describing the relationship between the injection pulse width and the valve closing completion timing.

FIG. 12 illustrates the relationship between the injection pulse width and the valve closing completion timing in three fuel injection devices having the same spring load (Fsp) and different preliminary strokes (PreSt).

For example, in a case where the injection pulse width is the smallest, the speed (constant-speed motion) of the movable iron core 206 becomes relatively slow, and the valve opening start timing becomes relatively late, so that the valve closing completion timing also becomes relatively late.

In a case where the valve closing completion timing is relatively early, the speed (constant-speed motion) of the movable iron core 206 increases, and a displacement amount of the valve body 201 against the spring load is relatively small as compared to the case where the injection pulse width is the smallest. Therefore, the influence of the spring load on the valve closing completion timing decreases, and the influence of the preliminary stroke (valve opening start timing) on the valve closing completion timing increases.

FIG. 13 illustrates the relationship between the injection pulse width and the valve closing completion timing in two fuel injection devices having the same preliminary stroke (PreSt) and different spring loads (Fsp).

As described above, in the case where the valve closing completion timing is relatively early, the displacement amount of the valve body 201 against the spring load is relatively small. Therefore, in the case where the valve closing completion timing is relatively early, the valve closing completion timing is substantially the same (unchanged) even if the spring load (Fsp) is different. Therefore, the valve opening start timing of each of the fuel injection devices can be detected from the valve closing completion timing of each of the fuel injection devices with the injection pulse width where the valve closing completion timing is relatively early.

Incidentally, the detection of the valve opening start timing is preferably performed at the injection pulse width where the valve closing completion timing is the earliest, but the present invention is not limited thereto. The detection of the valve opening start timing according to the present invention can be performed at any injection pulse width of a predetermined valve closing completion timing or less if the drive voltage is cut off at the injection pulse width before the transmission surface 218 of the movable iron core 206 abuts on the transmission surface 219 of the valve body 201.

[Relationship Between Valve Closing Completion Timing and Valve Opening Start Timing]

Next, the relationship between the valve closing completion timing and the valve opening start timing will be described with reference to FIG. 14.

Figure 14:
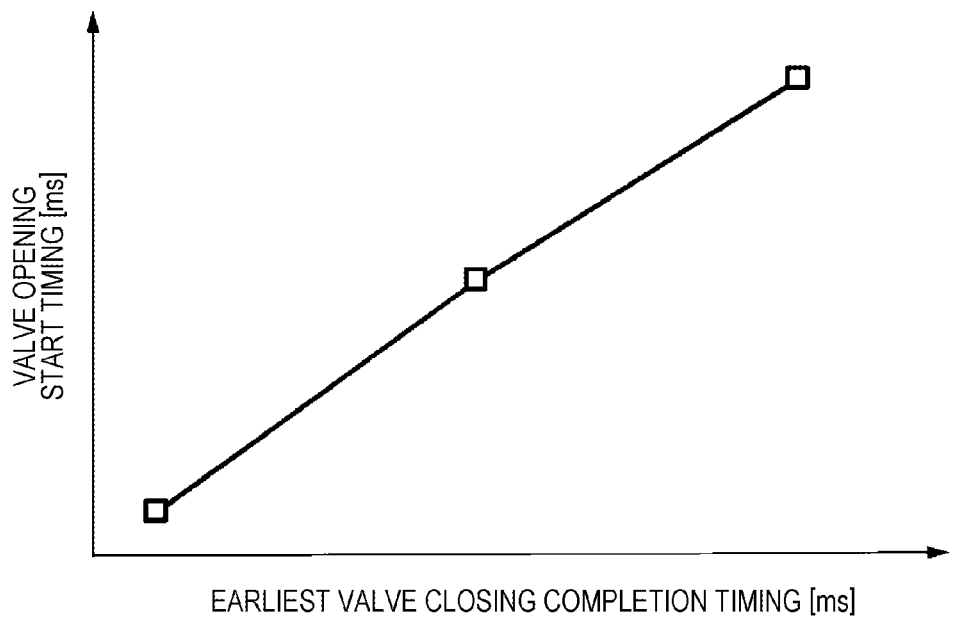
FIG. 14 is a graph for describing the relationship between the valve closing completion timing and a valve opening start timing in the fuel injection device illustrated in FIG. 2.

FIG. 14 is a graph for describing the relationship between the valve closing completion timing and the valve opening start timing in the case where the valve closing completion timing is the earliest.

In the case illustrated in FIGS. 12 and 13 where the valve closing completion timing is the earliest, a positive correlation is established between the valve closing completion timing and the valve opening start timing as illustrated in FIG. 14. Therefore, the valve opening start timing can be detected from the valve closing completion timing detected by the above-described method of detecting the inflection point by second-order differentiation of the drive voltage. Incidentally, information indicating the correlation in consideration of characteristics of a fuel injection device to be controlled is stored in a storage unit (not illustrated), and the CPU 501 detects a valve opening start timing from the information indicating the correlation read from the storage unit and a detected valve closing completion timing.

[Method of Correcting Injection Pulse Width]

Next, a method of correcting the injection pulse width will be described.

A fuel injection quantity (Qtar), a valve closing completion timing (Tb), and a valve opening start timing (Ta') satisfy the following relational expression. Incidentally, a and b are coefficients determined by characteristics (a diameter of an injection hole, a fuel pressure, and the like) of a fuel injection device.

$$Qtar = a(Tb - Ta') + b$$

The valve closing completion timing (Tb) can be controlled by the injection pulse width. In the present embodiment, the valve opening start timing (Ta') at which an individual difference (variation) occurs is detected, and the injection pulse width is corrected so as to set the valve closing completion timing (Tb) at which the target fuel injection quantity (Qtar) is obtained. In other words, the injection pulse width is corrected such that the target fuel injection quantity (Qtar) is injected based on the detected valve closing completion timing (Tb) and the estimated valve opening start timing (Ta'). Further, the valve closing completion timing (Tb) at which the target fuel injection quantity (Qtar) is obtained is calculated by the following Formula.

$$Tb = (Qtar - b)/a + Ta'$$

In addition, it is also necessary to consider the spring load in order to correct the injection pulse width so as to set the valve closing completion timing (Tb) for obtaining the target fuel injection quantity (Qtar) when the variation in the spring load occurs.

Therefore, the valve closing completion timing is detected from the drive voltage having the injection pulse width at which the drive voltage is cut off after the transmission surface 218 of the movable iron core 206 abuts on the transmission surface 219 of the valve body 201 in the present embodiment. Since the valve closing completion timing is greatly affected by not only the preliminary stroke but also the spring load, the valve closing completion timing is set as a biasing force-containing valve closing completion timing.

Further, the valve closing completion timing is subtracted from the drive voltage of the injection pulse width at which the drive voltage is cut off before the transmission surface 218 of the movable iron core 206 abuts on the transmission surface 219 of the valve body 201 using the biasing force-containing valve closing completion timing, thereby estimating the spring load. Accordingly, the injection pulse width in consideration of the spring load can be calculated.

Figure 15:
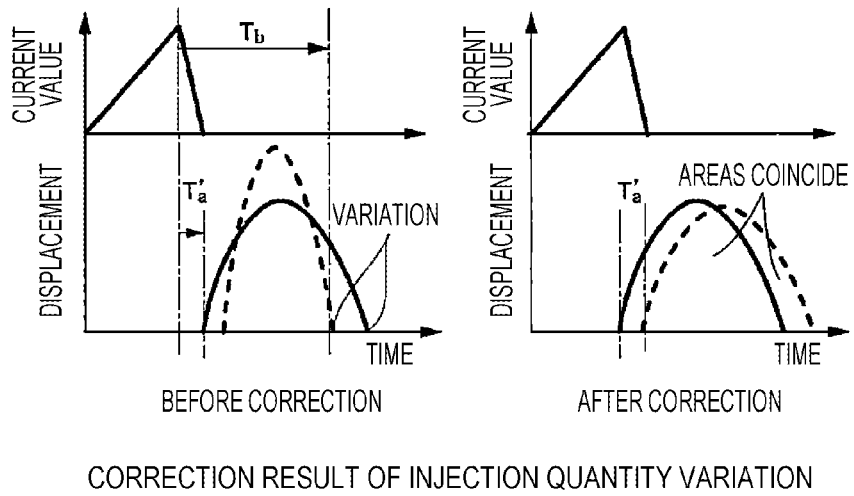
FIG. 15 is a graph for describing correction of a variation in the fuel injection quantity by the control device for the fuel injection device according to the embodiment of the present invention.

FIG. 15 is a graph for describing correction of a variation in a fuel injection quantity by the fuel injection control device 127.

FIG. 15 illustrates the relationship between the drive current and the displacement of the valve body 201. As illustrated in FIG. 15, there are variations in the spring load and the preliminary stroke before the fuel injection control device 127 corrects the injection pulse width, and thus, valve opening start timings and valve closing completion timings of two fuel injection devices are different.

Further, a displacement amount of the valve body 201 of each of the fuel injection devices is different, and an area surrounded by a line connecting the valve opening start timing and the valve closing completion timing and a curve indicating the displacement of the valve body 201 represents a fuel injection quantity. As illustrated in FIG. 14, the fuel injection quantities of the two fuel injection devices are different before the injection pulse width is corrected by the fuel injection control device 127.

After the injection pulse width is corrected by the fuel injection control device 127, the injection pulse width is corrected so as to set the valve closing completion timing (Tb) for obtaining the target fuel injection quantity (Qtar). That is, the valve closing completion timing (Tb) is changed such that the time (valve body operation time) from the valve opening start timing to the valve closing completion timing becomes the same.

Accordingly, the areas, each of which is surrounded by the curve indicating the displacement of the valve body 201 coincides with the line connecting the valve opening start timing and the valve closing completion timing, in the two fuel injection devices coincide. That is, it is possible to stabilize the fuel injection quantities in the plurality of fuel injection devices by suppressing the variation in the fuel injection quantity in each of the fuel injection devices.

[Estimation Accuracy of Valve Opening Delay Time in Consideration of Variation in Spring Load]

Next, estimation accuracy of valve opening delay time when a variation in the spring load is taken into consideration will be described with reference to FIG. 16.

Figure 16:
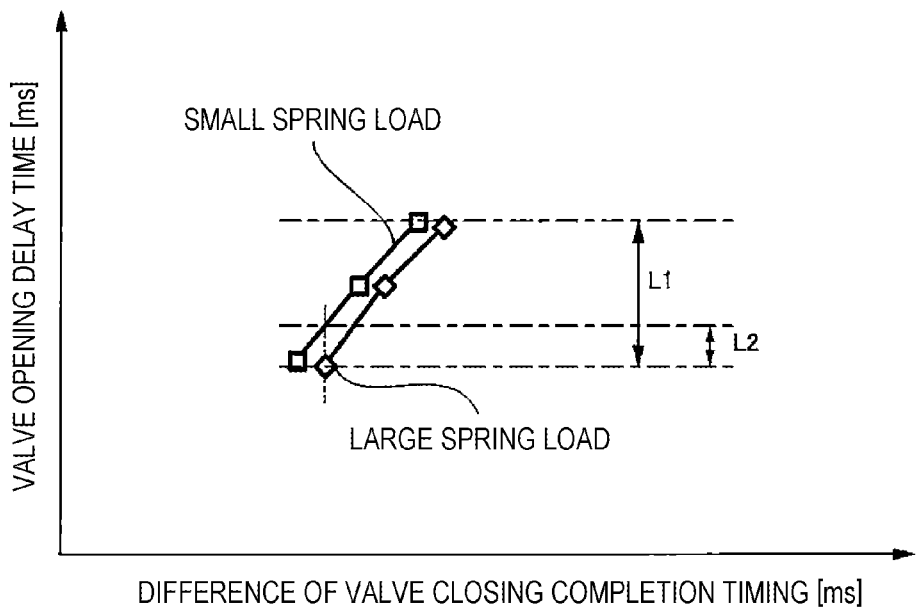
FIG. 16 is a graph for describing estimation accuracy of a valve opening delay time when considering the variation in the spring load by the control device for the fuel injection device according to the embodiment of the present invention.

FIG. 16 is a graph for describing the estimation accuracy of the valve opening delay time in consideration of the variations in the spring load.

FIG. 16 illustrates the relationship between a difference in the valve closing completion timing and the valve opening delay time. "Small spring load" in FIG. 16 indicates the smallest spring load within an allowable error range of the first spring member 210, and "large spring load" indicates the largest spring load within the allowable error range of the first spring member 210.

In the present embodiment, the valve opening start timing is estimated according to a variation in the preliminary stroke (the gap 250) based on the dimensional tolerance. At this time, if there is no variation (individual difference) in the spring load of the first spring member 210, no error occurs in the estimated valve opening start timing. For example, if all the first spring members 210 have the "large spring load", a valve opening start timing estimated from a detected valve closing completion timing and an actual valve opening start timing are substantially the same.

However, since the spring load also varies, an error occurs in the valve opening start timing estimated according to the value of the spring load. In the present embodiment, a variation in the valve opening start timing is suppressed within the range of L2 according to the variation in the spring load. For example, in the case of "large spring load", the estimated valve opening start timing is earlier than the actual valve opening start timing.

On the other hand, when the valve opening start timing is not estimated (the related art), a variation in the valve opening start timing occurs within the range of L1 larger than L2 according to a variation in the preliminary stroke and the variation in the spring load.

In this manner, the valve opening start timing is estimated from the valve closing completion timing in the present embodiment, so that the error between the estimated valve opening start timing and the actual valve opening start timing can be reduced. As a result, the injection pulse width can be accurately corrected, and the fuel injection quantities in the plurality of fuel injection devices can be stabilized.

SUMMARY

As described above, the control device for the fuel injection device (the fuel injection control device 127) according to the above-described embodiment controls a fuel injection device (the fuel injection device 200) including: a valve body (the valve body 201) that opens a fuel passage by separating from a valve seat (the valve seat 202); a movable element (the movable iron core 206) that causes an opening/closing operation of the valve body; and a stator (the fixed iron core 207) that attracts a movable element by a drive current flowing through a coil (the coil 208). This control device includes a control unit (the CPU 501) that controls the energization time of the drive current by a pulse width of a drive command pulse. The control unit of the control device estimates a valve opening start timing having a correlation with a valve closing completion timing detected by second-order differentiation of a drive voltage having a pulse width that is cut off before the movable element comes into contact with the valve body. Further, the pulse width of the drive command pulse is corrected based on the valve opening start timing.

Accordingly, the estimation accuracy of the valve opening start timing can be enhanced. As a result, the accuracy of the fuel injection quantity according to the drive command pulse generated based on the valve opening start timing can be enhanced, and the fuel injection quantity of the fuel injection device can be stabilized.

In addition, the control unit (CPU 501) in the control device for the fuel injection device according to the above-described embodiment corrects the pulse width of the drive command pulse so as to set the valve closing completion timing (Tb) according to the target injection quantity (Qtar) of fuel injected from the fuel injection device (fuel injection device 200) and the valve opening start timing (Ta'). Accordingly, the target injection quantity in the fuel injection device (fuel injection device 200) can be controlled with high accuracy, and the fuel injection quantity in each of the fuel injection devices can be stabilized.

In addition, the fuel injection device (fuel injection device 200) in the control device for the fuel injection device according to the above-described embodiment includes a biasing member (the first spring member 210) that biases the valve body (valve body 201) toward the valve seat (valve seat 202). In addition, the control unit (CPU 501) detects a biasing force-containing valve closing completion timing by second-order differentiation of the drive voltage of the pulse width that is cut off after the movable element (movable iron core 206) comes into contact with the valve body. Furthermore, the control unit estimates the biasing force (spring load) of the biasing member based on the biasing force-containing valve closing completion timing and the above-described valve closing completion timing. Further, the pulse width of the drive command pulse is corrected so as to set the valve closing completion timing according to the valve opening start timing, the biasing force of the biasing member, and the target injection quantity (Qtar).

Accordingly, the pulse width of the drive command pulse can be corrected in consideration of a variation in the valve opening start timing and a variation in the biasing force (spring load) of the biasing member (the spring members

210, 216, 217). As a result, the target injection quantity in the fuel injection device (fuel injection device 200) can be controlled with high accuracy, and the fuel injection quantity in each of the fuel injection devices can be stabilized.

In addition, the control unit (CPU 501) in the control device for the fuel injection device according to the above-described embodiment corrects the pulse width of the drive command pulse for each of the fuel injection devices such that the valve body operation time from the valve opening start timing to the valve closing completion timing is equal in the plurality of fuel injection devices (fuel injection devices 200). That is, the pulse width of the drive command pulse for each of the fuel injection devices is corrected such that the valve body operation time becomes equal to a target operation time. Accordingly, the fuel injection quantities of the plurality of fuel injection devices can be equalized, and the fuel injection quantity in each of the fuel injection devices can be stabilized.

In addition, the control device for the fuel injection device according to the above-described embodiment includes a storage unit that stores information indicating a correlation between the valve closing completion timing and the valve opening start timing. Further, the control unit (CPU 501) estimates the valve opening start timing based on the information indicating the correlation read from the storage unit in the vicinity of the pulse width of the drive command pulse at which the valve closing completion timing is earliest. Accordingly, the valve opening start timing can be easily estimated. Incidentally, the valve opening start timing may be calculated based on information indicating a correlation, or may be determined with reference to a data table indicating a correlation.

In addition, the control device for the fuel injection device according to the above-described embodiment corrects the pulse width of the drive command pulse such that the target injection quantity (Qtar) is injected based on the valve closing completion timing (Tb) and the valve opening start timing (Ta'). Accordingly, the target injection quantity in the fuel injection device (fuel injection device 200) can be controlled with high accuracy, and the fuel injection quantity in each of the fuel injection devices can be stabilized.

The embodiment of the control device for the fuel injection device of the present invention has been described above including operational effects thereof. However, the control device for the fuel injection device of the present invention is not limited to the above-described embodiment, and various modifications can be made within a scope not departing from a gist of the invention described in the claims. In addition, the above-described embodiment has been described in detail in order to describe the present invention in an easily understandable manner, and is not necessarily limited to one including the entire configuration that has been described above.

For example, the correction of the injection pulse width in half-lift control has been described in the above-described embodiment. However, the correction of the injection pulse width according to the present invention can also be applied to full-lift control.

In addition, in the above-described embodiment, the biasing force (spring load) of the biasing member is estimated based on the biasing force-containing valve closing completion timing and the valve closing completion timing, and the pulse width of the drive command pulse was corrected in consideration of the variations in the preliminary stroke and the spring load. However, regarding the correction of the pulse width of the drive command pulse according to the present invention, the pulse width of the drive command pulse may be corrected according to the valve opening start timing of each of the fuel injection devices without considering the spring load, for example, in a case where the variation in the spring load is small to such an extent that it is not necessary to consider.

In addition, the drive voltage having the pulse width that is cut off before the movable element comes into contact with the valve body is subjected to the second-order differentiation to detect the valve closing completion timing in the above-described embodiment. However, other methods may be used as the detection of the valve closing completion timing according to the present invention. In addition, the biasing force-containing valve closing completion timing is detected by second-order differentiation of the drive voltage having the pulse width that is cut off after the movable element comes into contact with the valve body in the above-described embodiment. However, the detection of the biasing force-containing valve closing completion timing according to the present invention may be performed using other methods.

REFERENCE SIGNS LIST

101 internal combustion engine
102 piston
103 intake valve
104 exhaust valve
106 ignition plug
107 ignition coil
108 water temperature sensor
109 ECU
110 intake pipe
111 exhaust pipe
112 three-way catalyst
113 oxygen sensor
115 collector
116 crank angle sensor
119 throttle valve
120 air flow meter
121 combustion chamber
122 accelerator opening degree sensor
123 fuel tank
124 low-pressure fuel pump
125 high-pressure fuel pump
126 fuel pressure sensor
127 fuel injection control device (control device for fuel injection device)
128 exhaust cam
129 high-pressure fuel pipe
131 crankshaft
132 connecting rod
200 fuel injection device
201 valve body
202 valve seat
206 movable iron core
207 fixed iron core
208 cell
209 housing
210 first spring member
212 fuel supply unit
214 intermediate member
215 fuel injection hole
216 second spring member
217 third spring member
218, 219 transmission surface
222 communication line
223 signal line

250 gap (preliminary stroke)
304 high voltage
317 current profile
330 inflection point
501 CPU

The invention claimed is:

1. A control device for a fuel injection device including a valve body that opens a fuel passage by separating from a valve seat, a movable element that causes an opening/closing operation of the valve body, and a stator that attracts the movable element by a drive current flowing through a coil, the control device comprising
 a control unit that controls an energization time of the drive current by a pulse width of a drive command pulse, wherein the control unit:
  estimates a valve opening start timing having a correlation with a detected valve closing completion timing,
  corrects the pulse width of the drive command pulse based on the valve opening start timing, wherein
   the fuel injection device includes a biasing member that biases the valve body toward the valve seat, and
   the control unit estimates a biasing force of the biasing member based on a biasing force-containing valve closing completion timing and the valve closing completion timing, and corrects the pulse width of the drive command pulse so as to set a target valve closing completion timing according to the valve opening start timing, the biasing force of the biasing member, and a target injection quantity.

2. The control device for the fuel injection device according to claim 1, wherein
 the control unit corrects the pulse width of the drive command pulse so as to set a valve closing completion timing according to a target injection quantity of fuel injected from the fuel injection device and the valve opening start timing.

3. The control device for the fuel injection device according to claim 1, wherein
 the control unit corrects the pulse width of the drive command pulse such that a valve body operation time from the valve opening start timing to the valve closing completion timing is equal to a target operation time.

4. The control device for the fuel injection device according to claim 1, wherein
 the control unit detects the valve closing completion timing by second-order differentiation of a drive voltage having a pulse width that is cut off before the movable element comes into contact with the valve body.

5. The control device for the fuel injection device according to claim 1, wherein
 the control unit detects the biasing force-containing valve closing completion timing by second-order differentiation of a drive voltage having a pulse width that is cut off after the movable element comes into contact with the valve body.

6. The control device for the fuel injection device according to claim 1, further comprising:
 a storage unit that stores information indicating a correlation between the valve closing completion timing and the valve opening start timing, wherein
 the control unit estimates the valve opening start timing based on the correlation in a vicinity of a pulse width of the drive command pulse in which the valve closing completion timing is earliest.

7. The control device for the fuel injection device according to claim 1, wherein
 the pulse width of the drive command pulse is corrected such that a target injection quantity is injected based on the valve closing completion timing and the valve opening start timing.

\* \* \* \* \*